(12) United States Patent
Wang et al.

(10) Patent No.: US 7,927,711 B2
(45) Date of Patent: Apr. 19, 2011

(54) DURABLE LAYER COMPOSITION FOR IN-MOLD DECORATION

(75) Inventors: Xiaojia Wang, Fremont, CA (US); Haiyan Gu, Fremont, CA (US); Fei Wang, Fremont, CA (US); HongMei Zang, Sunnyvale, CA (US); Tina Wu, Fongshan (TW); Xin Huo, Dover, DE (US); Rong-Chang Liang, Cupertino, CA (US)

(73) Assignee: SiPix Chemical Inc., Taoyuan County (TW)

( * ) Notice: Subject to any disclaimer, the term of this patent is extended or adjusted under 35 U.S.C. 154(b) by 980 days.

(21) Appl. No.: 11/743,007

(22) Filed: May 1, 2007
(Under 37 CFR 1.47)

(65) Prior Publication Data

US 2007/0267130 A1 Nov. 22, 2007

Related U.S. Application Data

(63) Continuation-in-part of application No. 11/004,627, filed on Dec. 3, 2004, now abandoned.

(60) Provisional application No. 60/532,003, filed on Dec. 22, 2003, provisional application No. 60/563,997, filed on Apr. 20, 2004.

(51) Int. Cl.
*B32B 37/00* (2006.01)
*C08J 3/28* (2006.01)
*C08F 2/50* (2006.01)
*C08F 2/46* (2006.01)

(52) U.S. Cl. ............... 428/500; 428/411.1; 522/162; 522/168; 522/167; 522/134; 522/135; 522/137; 522/140; 522/142; 522/143; 522/144; 522/88; 522/89; 427/508; 427/510

(58) Field of Classification Search ............. 522/162, 522/168, 167, 134, 135, 137, 140, 142, 143, 522/144, 88, 89; 427/508, 510; 428/411.1, 428/500
See application file for complete search history.

(56) References Cited

U.S. PATENT DOCUMENTS

| | | | |
|---|---|---|---|
| 4,565,857 A | | 1/1986 | Grant |
| 4,855,184 A | * | 8/1989 | Klun et al. .......... 428/425.1 |
| 5,081,179 A | | 1/1992 | Sezaki et al. |
| 5,795,527 A | | 8/1998 | Nakamura et al. |
| 5,955,204 A | | 9/1999 | Yamamoto et al. |
| 5,993,588 A | | 11/1999 | Nakamura |
| 6,245,182 B1 | | 6/2001 | Nakamura |
| 6,527,898 B1 | | 3/2003 | Nakamura |
| 2002/0160205 A1 | | 10/2002 | Garcia et al. |

OTHER PUBLICATIONS

Allen, K. (Oct. 2003). Electrophoretics Fulfilled. *Emerging Displays Review: Emerging Display Technologies, Monthly Report*—Oct. 2003, 9-14.

Bardsley, J.N. & Pinnel, M.R. (Nov. 2004) Microcup™ Electrophoretic Displays. *USDC Flexible Display Report*, 3.1.2. pp. 3-12-3-16.
Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.
Chen, S.M. (Jul. 2003) The Applications for the Revolutionary Electronic Paper Technology. *OPTO News & Letters*, 102, 37-41. (in Chinese, English abstract attached).
Chen, S.M. (May 2003) The New Applications and the Dynamics of Companies. *TRI.* 1-10. (in Chinese, English abstract attached, full translation availabe upon request).
Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.
Ho, Andrew. (Nov. 2006) *Embedding e-Paper in Smart Cards, Pricing Labels & Indicators*. Presentation conducted at Smart Paper Conference Nov. 15-16, 2006, Atlanta, GA.
Ho, C.,& Liang, R.C. (Dec. 2003 ). *Microcup (R) Electronic Paper by Roll-to-Roll Manufacturing Processes*. Presentation conducted at FEG, Nei-Li, Taiwan.
Ho, Candice. (Feb. 1, 2005) *Microcupt® Electronic Paper Device and Applicaiton*. Presentation conducted at USDC 4th Annual Flexible Display Conference 2005.
Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.
Lee, H., & Liang, R.C. (Jun. 2003) SiPix Microcup(R) Electronic Paper—An Introduction. *Advanced Display*, Issue 37, 4-9 (in Chinese, English abstract attached).
Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.
Liang, R.C. (Apr. 2004). *Microcup Electronic Paper by Roll-to-Roll Manufacturing Process*. Presentation at the Flexible Displays & Electronics 2004 of Intertech, San Fransisco, California, USA.
Liang, R.C. (Oct. 2004) *Flexible and Roll-able Display/Electronic Paper—A Technology Overview*. Paper presented at the METS 2004 Conference in Taipie, Taiwan.
Liang, R.C., (Feb. 2005) *Flexible and Roll-able Displays/Electronic Paper—A Brief Technology Overview*. Flexible Display Forum, 2005, Taiwan.
Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.
Liang, R.C., Hou, J., & Zang, H.M. (Dec. 2002) Microcup Electrophoretic Displays by Roll-to-Roll Manufacturing Processes. *IDW*, EP2-2, 1337-1340.
Liang, R.C., Hou, J., Zang, H.M., & Chung, J. (Feb. 2003). *Passive Matrix Microcup(R) Electrophoretic Displays*. Paper presented at the IDMC, Taipei, Taiwan.
Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

(Continued)

*Primary Examiner* — Sanza L McClendon
(74) *Attorney, Agent, or Firm* — Jianq Chyun IP Office

(57) ABSTRACT

This invention relates to a durable layer for in-mold decoration. The durable layer is formed from a composition comprising (i) a thermally crosslinkable and photochemically or radically graftable polymer, (ii) a non-ethylenical thermal crosslinker, and (iii) a radiation curable multifunctional monomer or oligomer. The durable layer of the present invention has excellent surface quality with a wider geometric tolerance and can be formed at low cost.

22 Claims, 1 Drawing Sheet

OTHER PUBLICATIONS

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology EXPO & Conference.

Liang, R.C., & Tseng, S. (Feb. 2003). *Microcup(R) LCD, An New Type of Dispersed LCD by A Roll-to-Roll Manufacturing Process.* Paper presented at the IDMC, Taipei, Taiwan.

Nikkei Microdevices. (Dec. 2002) Newly-Developed Color Electronic Paper Promises—Unbeatable Production Efficiency. *Nikkei Microdevices*, 3. (in Japanese, with English translation).

Wang, X., Kiluk, S., Chang, C., & Liang, R.C. (Feb. 2004). Mirocup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Wang, X., Li, P., Sodhi, D., Xu, T. and Bruner, S. et al., (Feb. 2006) *Inkjet Fabrication of Multi-Color Microcup® Electrophorectic Display.* the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, HM., (Feb. 2007) *Developms in Microcup® Flexible Displays.* Presentaiton conducted at the 6th Annual Flexible Display and Microelectronics Conference, Phoenix, AZ Feb. 6-8.

Zang, H.M. (Feb. 2004). *Microcup Electronic Paper.* Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes.* Presentation conducted at the Advisory Board Meeting, Bowling Green State University, Ohio, USA.

Zang, H.M., & Liang, R.C. (2003) Microcup Electronic Paper by Roll-to-Roll Manufacturing Processes. *The Spectrum*, 16(2), 16-21.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M. & Hou, Jack, (Feb. 2005) *Flexible Microcup® EPD by RTR Process.* Presentation conducted at $2^{nd}$ Annual Paper-Like Displays Conference, Feb. 9-11, 2005, St. Pete Beach, Florida.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

* cited by examiner

DURABLE LAYER COMPOSITION FOR IN-MOLD DECORATION

This application is a continuation-in-part of U.S. application Ser. No. 11/004,627, filed Dec. 3, 2004 now abandoned; which claims the priorities under 35 USC 119(e) of U.S. Provisional Application No. 60/532,003, filed Dec. 22, 2003; and U.S. Provisional Application No. 60/563,997, filed Apr. 20, 2004. The whole contents of the above priority applications are incorporated herein by reference in their entirety.

TECHNICAL FIELD

This invention relates to a composition suitable for a durable layer used in an in-mold decoration process.

BACKGROUND OF THE INVENTION

In-mold decoration processes involve decorating articles as they are formed, in mold, of a heated plastic material being injected into a mold cavity. Usually a tape or strip of a decorating or protective material is automatically or manually advanced, pre-fed and positioned in the mold cavity at each molding cycle, interfacing therein with the plastic material as it is filled into the mold cavity, under heat and pressure. As the article is formed, the decorating material forms on the surface of the article and becomes an integral and permanent part of the article, through thermal transfer in the in-mold decoration process. Other molding processes such as thermal forming, blow molding and compression molding or stamping may also be used for the transfer of the decorating or protective material. Sometimes the process may also be called in-mold labeling or in-mold coating, and the transferable protective material may be called a thermal transfer overcoat or durable coat layer.

The decoration tape or strip usually comprises a carrier layer, a release layer, a durable layer, an adhesive or tie-coat layer and also a layer of decorative designs (metal or ink). After the injection molding transfer, the carrier layer and the release layer are removed, leaving the durable layer as the outmost layer. The durable layer therefore is an essential part of the decorative tape or strip as it serves as a protective layer with scratch resistance, mar or abrasion resistance and solvent resistance to protect the decorative designs and also the molded article.

An effective durable layer must meet certain criteria. For example, it needs to be a non-tacky or non-blocking coating to allow roll-up and also to be able to tolerate subsequent image forming conditions. Secondly it needs to be conformable during the injection molding process to adapt to the 3D shape of the molded article. In addition, an effective durable layer needs to be able to withstand a high shear force and high temperature polymer melt in the injection molding process. Furthermore, it needs to have excellent solvent and abrasion resistance to protect the decorative image during usage.

U.S. Pat. No. 5,795,527 discloses an in-mold decoration process in which a protective layer known as the hard coat layer is formed from a UV or electron beam curable resin. U.S. Pat. No. 5,955,204 discloses a transfer material which has an UV absorbing layer as a protective layer. The UV absorbing layer contains an acrylic polymer in which a skeleton having an UV absorbing property is introduced onto the molecular chains. These durable layers, however, tend to crack or show defects if the layer is fully cured before molding. This is especially the case if a sharp curvature or steep step height is a critical feature of the molded article. On the other hand, a partially cured or under-cured durable layer is often not sufficiently hard for subsequent processing steps (e.g., sputtering or vapor deposition and the patterning of a metallic decoration layer which is a very desirable feature for most applications).

U.S. Pat. Nos. 5,993,588 and 6,527,898 disclose a protecting layer partially cured by thermal energy followed by UV post cure after the molding process. These references allege that the compositions disclosed therein may represent an advancement of the protecting layers and provide protecting layers which have improved abrasion and chemical resistance and show less tendency to crack at the curved part of the surface of a molded article. However, such protecting layers have certain disadvantages. First of all, the synthesis and purification of a highly acrylated polymer with reactive hydroxyl group(s) for thermal crosslinking are expensive and time-consuming. In addition, in order to achieve a metallic decorative layer of high gloss, the partially thermal-cured durable layer preferably has a high heat distortion temperature and yet still has (1) high photoreactivity for the UV post curing at a high speed to achieve acceptable scratch resistance, solvent resistance and hardness, and (2) high flexibility for 3D contour molding. Unfortunately these requirements tend to be in conflict and as a result, the durable layer compositions often have a narrow process window for optimum metal deposition and the molding/post curing processes. The durable/protective layer and the in-mold decoration foil resulted from any of these methods tend to be brittle and show defects such as cracking and dust particles during handling and conversion. Furthermore, the thermal partial curing of the durable layer composition in a production coater tends to be difficult to control. A high speed crosslinking required for low cost production often results in a short storage stability or green time of the coating fluid. It is highly desirable that a high rate of crosslinking in the coater is achieved by a wider coating process window with a more stable composition.

SUMMARY OF THE INVENTION

The first aspect of the present invention is directed to a composition useful for the formation of a durable layer used in an in-mold coating, decoration or labeling process. The composition comprises (i) a thermally crosslinkable and photochemically or radically graftable polymer, (ii) a thermal crosslinker and (iii) a radiation curable multifunctional monomer or oligomer.

In the formation of a durable layer of the present invention, a first network (hereinafter Network I) is first formed between the thermally crosslinkable and photochemically or radically graftable polymer (i) and the thermal crosslinker (ii) through thermal cure, with the radiation crosslinkable multifunctional monomer or oligomer (iii) dissolved or dispersed inside Network I. A second network (hereinafter Network II) is formed by post radiation exposure of the radiation crosslinkable multifunctional monomer or oligomer (iii) in Network I. The post radiation exposure after the molding process effectively grafts and/or intertangles Network I to Network II to form a semi or fully interpenetration network as a highly durable protective layer for the molded article.

The durable layer composition may further optionally comprise fillers, photoinitiators or photosensitizers, oxygen scavengers, UV absorbers or light stabilizers, antioxidants, lubricants or colorants.

The second aspect of the present invention is directed to an in-mold decoration process for the manufacture of an article having a durable layer of the present invention.

The third aspect of the present invention is directed to a plastic article having a durable layer of the present invention on its top surface.

The fourth aspect of the present invention is direct to a plastic article comprising a durable layer of the present invention and a decorative metallic layer and/or an ink layer.

The fifth aspect of the present invention is directed to an improved coating process comprising (1) the use of a retarder or quencher of the thermal crosslinking reaction in the durable layer composition to slow down the reaction during storage, and (2) blending the retarded or quenched durable layer composition with a crosslinker and/or catalyst by in-line blending immediately before the composition is coated on a substrate to speed up the rate of crosslinking.

The sixth aspect of the present invention is directed to an improved durable layer composition comprising a modified multifunctional isocyanate, epoxide or a precondensate thereof comprising the moiety, >CH—N<.

The present invention achieves the purpose of providing a durable layer for in-mold decoration which has excellent surface quality with a wider geometric tolerance, at low cost.

DETAILED DESCRIPTION OF THE INVENTION

Figure 1:
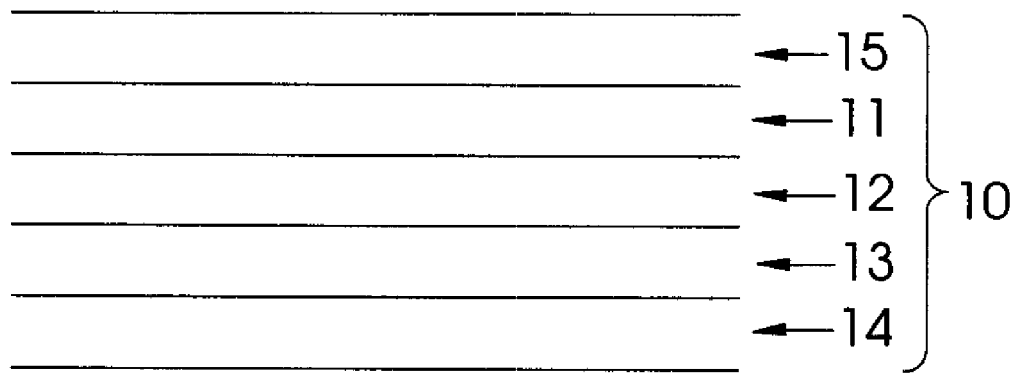
FIG. 1 is a cross section view of an in-mold decoration tape or strip.

FIG. 1 is a cross-section view of an in-mold decoration tape or strip (10) which comprises a carrier layer (15), a release layer (11), a durable layer (12), a decorative design layer (13), and an adhesive layer (14).

Figure 2:
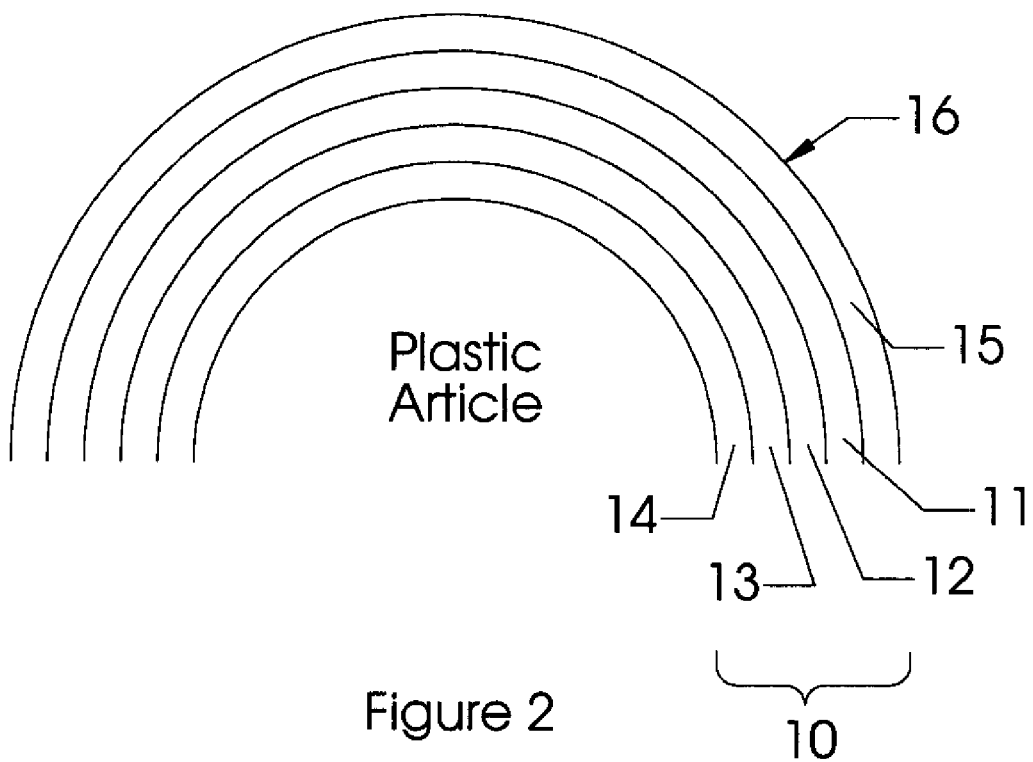
FIG. 2 shows how the in-mold decoration tape or strip is fed into a mold cavity.

In an in-mold decoration process, the tape or strip (10) is fed into a mold cavity (16) automatically or manually with the carrier layer (15) in contact with the mold surface as shown in FIG. 2. The tape or strip may be thermally formed to a desirable shape before the feeding step.

The carrier (15), release (11) and adhesive (14) layers may be formed by methods known in the art and all of the previously known carrier, release and adhesive layers may be incorporated into the present invention.

For example, the carrier layer (15) usually is a thin plastic film with a thickness from about 3.5 to about 100 microns, preferably about 10 to about 50 microns. Polyethylene terephthalate (PET), polyethylene naphthate (PEN) or polycarbonate (PC) films are particularly preferred because of their low cost, high transparency and thermomechanical stability.

The release layer (11) allows the in-mold decoration tape or strip to be released from the carrier layer in a manner that minimizes damage to the durable layer (12) and the decorative layer (13) and also enables a fully automated roll transfer process during molding. The release layer usually is a low surface tension coating prepared from a material such as wax, paraffin or silicone or a highly smooth and impermeable coating prepared from a material selected from the group consisting of melamine formaldehyde, metal thin film such as Al or Sn, crosslinked polyacrylates, silicone acrylates, epoxides, vinyl esters, vinyl ethers, allyls and vinyls, unsaturated polyesters or blends thereof. The release layer may comprise a condensation polymer, copolymer, blend or composite selected from the group consisting of epoxy, polyurethane, polyimide, polyamide, melamine formaldehyde, urea formaldehyde, phenol formaldehyde and the like.

The adhesive layer (14) is incorporated into the in-mold decoration tape or strip to provide optimum adhesion of the decorative layer to the top surface of the molded article. The adhesive layer may be formed from a material such as polyacrylate, polymethacrylate, polystyrene, polycarbonate, polyurethane, polyester, polyamide, epoxy resin, ethylene vinylacetate copolymers (EVA), thermoplastic elastomers or the like, or a copolymer, blend or composite thereof. Hot melt or heat activated adhesives such as polyurethane and polyamide are particularly preferred. The thickness of the adhesive layer may be in the range of about 1 to about 20 microns, preferably in the range of about 2 to about 6 microns.

The decorative layer (13) may be a metallic layer or an ink layer formed from a method such as vapor deposition or sputtering optionally followed by a patterning process. The ink pattern may be formed by a printing process such as gravure, flexo, screen, sublimation heat transfer or the like on a substrate layer. The substrate layer may be a plastic layer or an insulator-coated metal or metal oxide foil formed from carbon steel, stainless steel, Al, Sn, Ni, Cu, Zn, Mg or an alloy or oxide thereof.

The decorative designs may also be pre-shaped by thermoforming. In this case, the carrier layer (15) becomes part of the molded article. The decorative layer having raised or recessed patterns is typically in the range of about 0.2 to about 1 mm, preferably in the range of about 0.3 to about 0.7 mm, in thickness. It is usually thermoformed from an ABS (acrylonitril-butadiene-styrene), polycarbonate, acrylics, polystyrene or PVC sheet in a mold.

Alternatively, the decorative layer may be also pre-shaped by high pressure forming involving the use of high-pressure air to create decorative designs on a film. The decorative layer may also be formed by hydroforming in which a hydrostatic bladder, rather than air, serves as the forming mechanism.

The durable layer (12) disclosed herein constitutes the first aspect of the present invention. The durable layer is formed from a composition comprising (i) a thermally crosslinkable and photochemically or radically graftable polymer, (ii) a thermal crosslinker and (iii) a radiation curable multifunctional monomer or oligomer.

The thermally crosslinkable and photochemically and radically graftable polymers suitable for the present invention may include, but are not limited to, cellulose derivatives such as cellulose acetate butyrate (CAB), cellulose acetate propionate (CAP), hydroxypropyl cellulose (HPC), hydroxybutyl cellulose (HBC), hydroxyethyl cellulose (HEC), methyl cellulose (MC), carboxymethyl cellulose (CMC) or a copolymer thereof or polyvinyl alcohol derivatives such as polyvinyl acetal, polyvinyl butyral or copolymers thereof. Polymers of a high glass transition temperature (Tg) and high modules at the application conditions (temperature, pressure, shear rate etc.) are preferred. Particularly preferred polymers include cellulose acetate, cellulose acetate butyrate, cellulose acetate propionate, polyvinyl acetal and copolymers thereof.

The term "cellulose derivative", in the context of the present invention, may also include the modified cellulose derivatives. For example, in order to facilitate the thermal curing, the secondary hydroxyl group(s) of a cellulose derivative may be modified to generate primary hydroxyl group(s). Such modification may be accomplished by reacting a cellulose derivative such as CAB, CAP, HPC, HBC, HEC, MC, CMC or a copolymer thereof with a diisocyanate followed by a chain extender, preferably a multifunctional chain extender. Examples of multifunctional chain extenders may include, but are not limited to, multifunctional alcohol, thiol, amine, imine, amide, urea or thiourea. More specifically, the multifunctional chain extender may be a diol, triol, tetraol, diamine, triamine, polyimine, amino alcohol, amino thiol, aminodiol, aminodithiol, urea or thiourea. In one embodiment, the multifunctional chain extender may be propanediol, butanediol, pentanediol, hexanediol, trimethylol propane, N,N,N'N'-tetrakis(2-hydroxyethyl)ethylenediamine, ethanolamine, diethanolamine, triethanolamine, ethylene diamine or diethylene triamine. The conditions for these reactions are well known in the art.

The thermally crosslinkable and photochemically and radically graftable polymers may be present in the composition in the amount of about 10% to about 70%, preferably about 20% to about 50%, by weight of the total solid content of the composition.

Thermal crosslinkers suitable for the present invention may include, but are not limited to, multifunctional isocyanates, multifunctional thioisocyanates, multifunctional epoxides, multifunctional aziridines, multifunctional carbodiimides, multifunctional ketenimides and formaldehyde precondensates. Multifunctional isocyanates are preferred. Multifunctional isocyanates and multifunctional epoxides comprising the moiety, >CH—N<, are the more preferred.

The term "multifunctional" refers to the fact that the thermal crosslinkers preferably have more than two functional groups and more preferably more than two same functional groups. For example, each of the compounds referred to above (i.e., multifunctional isocyanates, multifunctional thioisocyanates, multifunctional epoxides, multifunctional aziridines, multifunctional carbodiimides and multifunctional ketenimides) preferably has more than two isocyanate, thioisocyanate, epoxide, aziridine, carbodiimide or ketenimide functional groups, respectively.

In addition, the thermal crosslinkers used in the present invention preferably are non-ethylenical. In other words, the thermal crosslinkers preferably do not have a double bond in their structures.

Tertiary amines comprising an active α-hydrogen have been known as oxygen scavengers or auto-oxidizer for radical type of UV curing reaction to significantly improve the efficiency of UV curing particularly at the surface of the coating. However, it is found that most low molecular weight tert-amines, such as triethyl amine, triethanol amine or diethanol amine, are not effective as expected when the durable layer composition is coated and crosslinked at a high speed in a high temperature dryer. This may be due to the fact that the low molecular weight oxygen scavengers tend to escape from the coated film during the drying and/or thermal crosslinking step. In the case when a multifunctional isocyanate is used as the thermal crosslinker, tert-amines containing more than one reactive functional groups such as —OH, —NH$_2$, or —SH tend to form gel particles or network structure prematurely during storage or coating. The use of a multifunctional isocyanate or epoxide comprising the moiety, >CH—N< as the crosslinker effectively reduces the evaporation rate, widens the coating process window and improves the efficiency of the post UV curing process.

The thermal crosslinker may be present in the composition in the amount of about 2% to about 60%, preferably about 3% to about 40%, more preferably about 5 to about 25%, by weight of the total solid content of the composition.

Radiation crosslinkable monomers or oligomers suitable for the present invention may include, but are not limited to, multifunctional acrylates, multifunctional methacrylates, multifunctional vinyls, multifunctional vinylethers, multifunctional vinyls and allyls and multifunctional epoxides.

The radiation crosslinkable monomers or oligomer may be present in the composition in the amount of about 5% to about 80%, preferably about 20% to about 50%, by weight of the total solid content of the composition.

In one embodiment, the present invention is directed to a durable layer for in-mold decoration, which is formed from a composition comprising: (i) a thermally crosslinkable and photochemically or radically graftable polymer, (ii) a non-ethylenical thermal crosslinker, and (iii) a radiation curable multifunctional monomer or oligomer.

In another embodiment, the present invention is directed to a durable layer for in-mold decoration. The durable layer comprises: (a) a first network formed from the thermally crosslinkable and photochemically or radically graftable polymer (i) and the non-ethylenical thermal crosslinker (ii), and (b) a second network formed from the radiation curable multifunctional monomer or oligomer (iii) dissolved or dispersed inside the first network, wherein the first network and the second network form an interpenetration network.

In the formation of a durable layer of the present invention, a first network (hereinafter Network I) is first formed between the thermally crosslinkable and photochemically and radically graftable polymer (i) and the thermal crosslinker (ii) through thermal cure, with the radiation curable multifunctional monomer or oligomer (iii) dissolved or dispersed inside Network I. A second network (hereinafter Network II) is formed by radiation exposure of the radiation curable multifunctional monomer or oligomer (iii) inside Network I. The photochemical process or radical produced during the radiation exposure may further graft Network I to Network II to form an IPN (Inter-Penetrating Network) structure as a durable layer.

In one embodiment, the present invention is directed to a process for forming a durable layer for in-mold decoration. The process comprises the steps of: (a) thermally curing a thermally crosslinkable and photochemically or radically graftable polymer (i) and a non-ethylenical thermal crosslinker (ii) to form a first network with a radiation curable multifunctional monomer or oligomer (iii) dissolved or dispersed inside said first network; and (b) exposing the radiation curable multifunctional monomer or oligomer (iii) to radiation to form a second network, wherein the first network and the second network form an interpenetration network.

For example when CAB or CAP, polyisocynate and a UV curable oligomer are used as components (i), (ii) and (iii), respectively, Network I having the urethane structure is first formed between (i) and (ii) with the UV curable oligomer (iii) dissolved or dispersed in Network I. The subsequent exposure to radiation will cause the formation of Network II having the crosslinked acrylic structure which in turn grafts onto Network I to form an IP network as a durable layer.

In addition to the three main components, the composition may further comprise additives such as fillers (e.g., silica, CaCO$_3$, microgel particles or mica), photoinitiators or photosensitizers (e.g., Norrish Type 1, Type 2 and Type 3 photoinitiators, ITX [isopropyl thioxanthone], Irgacure 651, 907, 369 or 184 from Ciba Specialty Chemicals), oxygen scavengers (e.g., triethylamine, triethanolamine, N-methyl diethanolamine, alkyl N,N-dimethylaminobenzoate or 2,6-diisopropyl-N,N-dimethylaniline), UV absorbers (e.g., triazine or benzotriazole derivatives) or light stabilizers (e.g., hindered amine light stabilizers), antioxidants (e.g., BHT [butylated hydroxytoluene], MEHQ [hydroquinone monomethylether] or tetrakis[methylene-3(3',5'-di-tert-butyl-4-hydroxyphenyl) propionate]methane), lubricants (e.g., silicon acrylates, zinc stearate or microcrystalline wax) or colorants.

If present, the typical concentration range of the filler may be about 3% to about 30%, by weight of the total solid content of the composition; the typical concentration range of the photoinitiator or photosensitizer may be about 1% to about 5% by weight of the total solid content of the composition; the typical concentration range of the antioxidant may be about 0.01% to about 1% by weight of the total solid content of the composition; the typical concentration range of the oxygen scavenger may be about 1% to about 5% by weight of the total solid content of the composition; the typical concentration range of the UV absorber may be about 0.5% to about 4% by weight of the total solid content of the composition; the typical concentration range of the light stabilizer may be about 0.1% to about 3% by weight of the total solid content of the composition; and the typical concentration range of the lubricant may be about 0.5% to about 5% by weight of the total solid content of the composition.

The three main components, along with the optional additive(s) are dispersed or dissolved in a suitable solvent, such as ketones, esters, ethers, glycol ethers, glycolether esters, pyrrolidones, with ketones and esters such as methyl ethyl ketone (MEK), methyl propyl ketone (MPK), cyclohexanone, ethyl acetate, propyl acetate and butyl acetate as the more preferred.

In the formation of the in-mold decorative tape or strip (10), the release layer (11), the durable layer (12), the decorative design layer (13) and the adhesive layer (14) are sequentially coated or laminated onto the carrier layer (15). The lamination or coating may be accomplished by coating methods such as slot coating, doctor blade coating, gravure coating, roll coating, comma coating, lip coating and the like or printing methods such as gravure printing, screen printing and the like.

After the decorative tape or strip is formed, the thermal cure is performed during the drying of the durable layer coating step, optionally with a post cure step after the coating. The thermal cure can be carried out at about 50° C. to about 120° C. for various lengths of time, for example, several minutes to hours, depending on the curing conditions and the composition. The UV cure is performed after the injection molding process when the protective layer has been transferred to the surface of the molded article. The molded articles are placed on a UV conveyor that is running at, for example, 0.6 ft/min to 10 ft/min. The UV curing energy needed is usually in the range of from about 0.1 to about 5 J/cm$^2$, preferably about 0.3 to about 1.2 J/cm$^2$.

To improve the coating process window, a retarder or quencher of the thermal crosslinking reaction may be added to the durable layer composition to slow down the reaction during storage. Suitable reaction retarders or quenchers may include, but are not limited to, silica, acetic acid, acetic anhydride, maleic anhydride and phthalic anhydride, with silica as the most preferred. The retarder or quencher is usually added in an amount ranging from about 0.1% to about 3%, preferably about 0.3% to about 1%, by weight of the total solid content of the composition.

In addition, a crosslinker and/or catalyst such as a organotin, polyamine or polyol in an amount ranging from about 0.01% to about 5%, preferably from about 0.1% to about 2% by weight of the total solid content of the composition, may be blended (by in-line blending) into the retarded or quenched durable layer composition immediately before the composition is coated on a substrate to speed up the rate of crosslinking. Suitable polyamines may include, but are not limited to, Jeffamines from Huntsman (Salt Lake City, Utah), triethylenetetraamine, diethylenetriamine and polyethyleneimine.

The durable layer of the present invention is suitable for all in-mold decoration processes for the manufacture of a plastic article. Examples of the material suitable for the article may include, but are not limited to, thermoplastic materials such as polystyrene, polyvinyl chloride, acrylics, polysulfone, polyarylester, polypropylene oxide, polyolefins, acrylonitrile-butadiene-styrene copolymers (ABS), methacrylate-acrylonitrile-butadiene-styrene copolymers (MABS), polycarbonate, polybutylene terephthalate (PBT), polyethylene terephthalate (PET), polyurethanes and other thermoplastic elastomers or blends thereof, and thermoset materials such as reaction injection molding grade polyurethanes, epoxy resin, unsaturated polyesters, vinylesters or composites, prepregs and blends thereof.

The article may be a plastic cover of a cell phone or pager. In fact, the durable layer is useful for any plastic articles manufactured from an in-mold decoration process, such as personal accessories, toys or educational devices, plastic cover of a personal digital assistant or e-book, credit or smart cards, identification or business cards, face of an album, watch, clock, radio or camera, dashboard in an automobile, household items, laptop computer housings and carrying cases or front control panels of any consumer electronic equipments. This is clearly not exhaustive. Other suitable plastic articles would be clear to a person skilled in the art and therefore they are all encompassed within the scope of the present invention. The durable layer of the present invention is also useful in applications such as the thermal transfer protective coating for thermal printing, inkjet printing and passport and other identification applications.

The present invention has achieved the purpose of providing a durable layer or protective coating for in-mold decoration which has excellent surface quality with a wider geometric tolerance, at low cost.

EXAMPLES

The following examples are given to enable those skilled in the art to more clearly understand, and to practice, the present invention. They should not be considered as limiting the scope of the invention, but merely as being illustrative and representative thereof.

Preparation 1

Preparation of Release Layer for In-Mold Decoration 15.0 Gm of CYMEL 303ULF (hexamethoxymethylmelamine from Cytec Industries Inc., West Paterson, N.J.) and 105 gm of MEK were mixed at 600 rpm for 5 minutes. 0.3 Gm of CYCAT600 (a proprietary catalyst from Cytec Industries Inc., West Paterson, N.J.) was added and stirred at 600 rpm for additional 5 minutes. The resultant solution was then filtered with a 0.2 um filter and coated onto a 1.42 mil PET (SH22, from SKC, South Korea) with a #4 Meyer bar for a targeted thickness of 1 um. The coated film was then air dried for 5 minutes and baked in an oven at 130° C. for 10 minutes.

Example 1

Preparation of IMD Tape Having a Durable Layer Between Release and Adhesive Layers 100 Gm of a solution of 10 gm CAB-553-0.4 (cellulose acetate butyrate, from Eastman Chemical Co.) in 90 gm of MEK, 15 gm of Ebcryl 1290 (aliphatic polyurethane acrylate, UCB Chemicals), 10 gm of MEK-ST (silica dispersion from Nissan Chemicals), 0.775 gm of Irgacure 907 (4-methylthio-2-methyl-2-morpholinopropiophenone from Ciba Specialty Chemicals) and 0.775 gm of Irgacure 1800 (from Ciba Specialty Chemicals, bis-acylphosphinoxide 25% and 2-hydroxycyclohexyl phenyl ketone 75%) in 4.65 gm of MEK, 6 gm of Desmodur N3400 (polyisocyanate, Bayer Polymers) and 0.4 gm of DBTDL (dibutyl tin dilaurate from Aldrich) were thoroughly mixed in a beaker for about 20 minutes. The resultant durable layer composition was coated on the release film prepared from Preparation 1 with a #22 Meyer bar. The coated composite film was air dried and cured at 80° C. for 2 hours. An adhesive consisting of 1 part of Sancure 2710 (aliphatic polyurethane from Noveon Inc., Cleveland, Ohio) and 3 parts of DI water was then overcoated onto the cured durable layer using a #16 Meyer bar with a target thickness of about 3 um. The resultant film was inserted into an injection mold. A mixture of PMMA (polymethylmethacrylate) and polycarbonate were injected into a mold cavity at 490° F. and 550° F., respectively, with the adhesive layer facing the plastic mixture. The durable layer and the adhesive layer were completely transferred to the molded plastic article after the release film was peeled off. The molded article was then post cured by UV exposure (5.13 J/cm$^2$) using a Fusion conveyor curing system. The solvent resistance and abrasion resistance of the durable layer were evaluated and the results are summarized in Table 1.

Samples were tested for solvent resistance by the MEK drop test. Abrasion resistance was tested using Norman abrasion tester with a load of 175 gm and 50 cycles.

Example 2

The composition and procedure of Example 1 were followed except that the polyisocyanate N3400 was replaced with Desmodur N3300A (aliphatic polyisocyanate from Bayer Polymers) in the same weight amount and the resultant durable layer was cured at 120° C. for 30 minutes. The test results are also summarized in Table 1.

Example 3 (Comparative Example)

The same procedure of Example 1 was followed, except that the polyisocyanate Desmodur N3400 and DBTDL were removed from the durable layer composition. The test results are summarized in Table 1.

Example 4 (Comparative Example)

The same procedure of Example 2 was followed, except that the UV oligomer Ebcryl 1290 and photoinitiators Irgacure 907 (4-methylthio-2-methyl-2-morpholinopropiophenone) and Irgacure 1800 (1:3 mixture of bis-acylphosphinoxide and 2-hydroxycyclohexyl phenyl ketone, both from Ciba Specialty Chemicals) were removed from the durable layer composition. The test results are also summarized in Table 1.

Example 5 (Comparative Example)

The same procedure of Comparative Example 1 was followed, except that the cellulose acetate butyrate in the durable layer composition was replaced with Evalcite 2041 (PMMA or polymethylmethacrylate from Lucite International, Inc.) in the same weight amount. The test results are summarized in Table 1.

TABLE 1

| Example | Binder | (i) | (ii) | (iii) | Solvent Resistance | Scratch Resistance | Surface Hardness | PMMA Injection Molding @ 490° F. | PC Injection Molding @ 550° F. |
|---|---|---|---|---|---|---|---|---|---|
| 1 | | CAB | N3400 | Ebcryl 1290 | Excellent | Excellent | 3H | Pass | Pass |
| 2 | | CAB | N3300 | Ebcryl 1290 | Excellent | Excellent | 3H | Pass | Pass |
| Comp 3 | | CAB | None | Ebcryl 1290 | Failed$^a$ | Poor$^b$ | <H | Pass | Poor$^d$ |
| Comp 4 | | CAB | N3300 | None | Failed$^a$ | Poor$^b$ | <H | Pass | Poor$^d$ |
| Comp 5 | PMMA | None | None | Ebcryl 1290 | Good | Fair$^c$ | <H | Pass | Poor$^d$ |

Notes:
(i) thermally crosslinkable and photochemically and radically graftable polymer
(ii) thermal crosslinker
(iii) radiation curable multifunctional monomer or oligomer
$^a$Fail: coating became haze
$^b$Poor: obvious abrasion mark
$^c$Fair: slight abrasion mark
$^d$Poor: distorted film transfer As shown in Table 1, the use of a radiation graftable polymer and a thermal crosslinker greatly improved the solvent resistance, scratch resistance, surface hardness and the high temperature processability of an in-mold decorative tape or strip.

Examples 6A & 6B

Use of a Reaction Quencher or Retarder to Improve the Coating Process Window 18.36 Gm of a 15% solution of CAP504-0.2 (cellulose acetate propionate, from Eastman Chemicals, Co.) in MEK was mixed with 6.06 gm of a 15% solution of Desmodur N3300A in MEK and 0.267 gm of a 1% DBTDL solution in MEK in a glass container. The mixture was stirred at 50° C. for 39 minutes for pre-reaction. To the pre-reacted CAP solution, 0.5% and 1% by weight of a colloidal silica, MEK-ST (30% dispersion in MEK, from Nissan Chemical), was added. The coating solution green times at 50° C. and 25° C. were measured. The results are shown in Table 2.

Example 7 (Comparative)

The procedure of Example 6 was followed except that the MEK-ST solution was replaced with the same amount of MEK.

TABLE 2

| Example | % of MEK-ST | Green time (50° C.) | Green time (25° C.) |
|---|---|---|---|
| 6A | 0.5% | 1 hr & 36 min | ~8 hr. |
| 6B | 1% | 4 hr & 49 min. | >48 hr. |
| 7 | 0% | 7 min. | <2 hr. |

It is evident from Table 2 that the addition of the colloidal silica MEK-ST effectively slowed down the condensation reaction between CAP and polyisocyanate N3300A. The coating green time has been increased from <2 hrs to about 8 hours and >48 hrs when 0.5% and 1% by weight of the silica was used, respectively.

Example 8

A solution "A" was prepared by mixing 18.36 gm of a 15% CAP504-0.2 solution in MEK with 6.06 gm of a 15% Desmodur N3300A solution in MEK and 0.267 gm of a 1% DBTDL solution in MEK in a glass container. The mixture was mechanically stirred at 50° C. for 39 minutes for pre-reaction. To the mixture, 0.233 gm of 30% MEK-ST as the isocyanate reaction retarder was added and the solution was cooled down and filtered through a 20 μm filter. 3.08 Gm of 28% Socal 322 (coated $CaCO_3$ from Solvay Chemicals.) dispersion in cyclohexanone was added gradually into solution "A" with homogenization for 10 minutes. The resulting solution "A" mixture was then sonicated for 30 minutes before use.

In a second container, a solution "B" was prepared by mixing 4.00 gm of Ebcryl1290, 0.183 gm of a 75% triethanolamine solution in MEK, 0.183 gm of a 75% poly-Q (aminated tetrol from Arch Chemicals, Norwalk, Conn.) solution in MEK, 0.782 gm of BMS [4-(4-methylphenylthiophenyl)-phenylmethanone], 0.416 gm of Irgacure 651 (2,2-dimethoxy-2-phenyl acetophenone from Ciba Specialty Chemicals), 0.078 gm of ITX (isopropyl thioxanthone), 0.104 gm of DBTDL and 0.052 gm of Irganox 1035 (thiodiethylene bis[3-(3,5-di-tert-butyl-4-hydroxyphenyl)propionate] from Ciba Specialty Chemicals) with 10.06 gm of MEK for 10 minutes.

Solution "A" mixture and solution "B" were combined and mixed by a Votec mixer for 2 minutes and sonicated for 5 minutes. The final solution was coated on a 2 mil PET (which was already coated with a release layer) prepared previously to yield an 8 um thick durable layer coating. The durable layer was then thermally cured at 75° C. for 20 minutes.

IMD Performance

An adhesive consisting of 1 part of Sancure 2710 (aliphatic polyurethane from Noveon Inc., Cleveland, Ohio) and 3 parts of DI water was then overcoated onto the cured durable layer using a #10 Meyer bar with a target thickness about 2 μm. The durable layer was then in-mold transferred to PMMA lens in an injection molding machine and UV post cured at 1 $J/cm^2$. The hardness, abrasion and MEK resistance of the in-mold transferred PMMA lens are listed in Table 3.

Example 9

The procedure of Example 8 was followed except that Desmodur N3300A was replaced with the same amount of a CAP 504-0.2 solution.

TABLE 3

| Example | Pencil Hardness (500 gm) | Abrasion Resistance | MEK Resistance |
|---|---|---|---|
| 8 | >2H | Excellent | Pass |
| 9 | >2H | Very poor | Pass |

It is evident from the results of Examples 8 and 9 (Table 3) that the thermal cure of CAP with Desmodur polyisocyanate N3300A significantly improved the abrasion resistance. The use of the silica reaction retarder in Example 8 showed a satisfactory performance with an improved coating process window.

Example 10

Pre-condensate of Triethanolamine and Polyisocyanate as the Thermal Crosslinker

I. Synthesis of Pre-condensate of Desmodur N3300A and Triethanolamine:

To a 50 ml round bottom flask added 1 gm of triethanolamine (TEOA, 6.7 mmol, dried with molecular sieves) and 11.66 gm of Desmodur N3300 A (60.4 mmol, from Bayer polymer), 49.37 gm of anhydrous methylethyl ketone (MEK) and 1.26 gm of 1% dibutyltindilaurate (DBTDL) in anhydrous MEK. The reaction mixture was refluxed for 12 hours under Argon. The pre-polymer was then used immediately without any purification. The solid content of the pre-polymer is 19.9% by weight.

II. Durable Layer Formulation using Pre-condensate of Desmodur N3300A and Triethanolamine:

A Part "A" solution was prepared by mixing 7.68 gm of 15% CAP504-0.2 (cellulose acetate propionate, from Eastman Chemicals, Co.) solution in MEK and 3.08 gm of trientanolamine/Desmodur N3300A pre-condensate solution as prepared above and 0.112 gm of a 1% DBTDL solution in MEK. The mixture was allowed to prereact at 50° C. for 5 minutes.

A Part "B" solution was prepared by mixing 2.96 gm of 50% Ebcryl1290 in MEK, 1.29 gm of 28% Socal 322 (from Solvay Chemicals.) dispersion in cyclohexanone, 0.10 gm of 30% MEK-ST, 0.2 gm of a 25% poly-Q solution in MEK and 0.22 gm of a photoinitiator (PI) solution containing 24% of BMS, 12.7% of Irgacure 651, 2.4% of ITX, 6.34% of DBTDL and 1.58% of Irganox 1035 (thiodiethylene bis[3-(3,5-di-tert-butyl-4-hydroxyphenyl)propionate]) and 3.18% of Tinuvin 123 (decanedioic acid, bis(2,2,6,6-tetramethyl-1-(octyloxy)-4-piperidinyl)ester, reaction products with 1,1-dimethylethylhydroperoxide and octane from Ciba Specialty Chemicals) in MEK.

After the pre-reaction of Part "A", Part "A" and Part "B" were mixed by a Votec mixer for 2 minutes and sonicated for 5 minutes, then coated on a 2 mil PET (which was precoated with a release layer from Preparation 1 to yield an 8 um thick durable coating. The durable layer was then thermally cured at 75° C. for 20 minutes.

The solid percentages of the formulation are shown in the following table.

|         | Part A (Solid %) | | | Part B (Solid %) | | | | |
|---------|------------------|---|---|---|---|---|---|---|
| Example | CAP-504-0.2 | Pre-condensate | DBTDL | MEK-ST | EB 1290 | PolyQ | PI | CaCO₃ |
| 10 | 31.96 | 11.96 | 0.13 | 0.81 | 40.85 | 1.4 | 3 | 10.01 |

A 2 um thick of an adhesive layer containing 1 part of Sancure 2710 and 3 parts of DI water was coated on the durable layer. The adhesive/durable layer/release/PET foil was then inserted in an injection molding machine. The durable/adhesive layers were in-mold transferred to PMMA lens and UV post-cured at 1 J/cm$^2$ for performance evaluation. Satisfactory performance was observed and the results are listed in Table 4.

Example 11

Improved Process Window by a Silica Reaction Retarder

A solution Part "A" was prepared by mixing 7.68 gm of 15% CAP504-0.2 (cellulose acetate propionate, from Eastman Chemicals, Co.) solution in MEK and 2.53 gm of 15% Desmodur N3300A solution in MEK and 0.112 gm of a 1% DBTDL solution in MEK and allowed for pre-reaction at 50° C. for 15 minutes. The mixture was then quenched with 1.8 gm of 30% MEK-ST and cooled down quickly to room temperature.

A solution Part "B" was prepared by mixing 2.96 gm of 50% Ebcryl 1290 solution in MEK, 0.4 gm of a 25% poly-Q solution in MEK, 0.076 gm of 25% triethylenetetraamine solution in MEK and 0.22 gm of a photoinitiator (PI) solution containing 24% of BMS, 12.7% of Irgacure 651, 2.4% of ITX, 6.34% of DBTDL and 1.58% of Irganox 1035 (thiodiethylene bis[3-(3,5-di-tert-butyl-4-hydroxyphenyl)propionate]) and 3.18% of Tinuvin 123 (decanedioic acid, bis(2,2,6,6-tetramethyl-1-(octyloxy)-4-piperidinyl)ester, reaction products with 1,1-dimethylethylhydroperoxide and octane from Ciba Specialty Chemicals) in MEK.

The pre-reacted Part "A" and Part "B" were mixed by a Votec mixer for 2 minutes, and coated on a 2 mil PET (which was pre-coated with a release layer from Preparation 1) to yield an 8 um thick durable layer coating. The durable layer was then thermally cured at 75° C. for 20 minutes.

A 2 um thick of an adhesive layer containing 1 part of Sancure 2710 and 3 parts of DI water was coated on the durable layer. The durable layer was in-mold transferred to PMMA lens and UV cured at 1 J/cm$^2$ for performance evaluation. Satisfactory performance with an improved coating green time was observed and the results are listed in Table 4.

TABLE 4

| Example | UV Curing Dosage (J/cm2) | Pencil Hardness (500 gm) | Abrasion Resistance | MEK Resistance |
|---------|---|---|---|---|
| 10 | 1 | >2H | Excellent | Pass |
| 11 | 1 | >2H | Excellent | Pass |

Example 12

Modification of CAP 3.6 Gm of isophorone diisocyanate (IPDI) was added to 100 gm of 15% CAP504-0.2 (with hydroxy number 214, from Eastman) in MEK. After mixing well, 1.86 gm of a 1% dibutyltin dilaurate (DBTDL from Aldrich) solution in MEK was added. The solution was stirred at 55° C. for 1 hour. The NCO concentration was measured by back titration (ASTM D-5155). The same equivalent of diethanolamine (from Aldrich) was then added in until FTIR showed that a peak at 2268 cm$^{-1}$ disappeared. The hydroxy equivalent weight of the resultant polyol was around 450.

Example 13

Preparation of Durable Layer with Modified Cap

100 Gm of a solution containing 15 gm of the modified CAP prepared in Example 12 and 85 gm of MEK, 44 gm of a solution formed form 15 gm of Desmodur N3300A (aliphatic polyisocyanate, Bayer Polymers) in 85 gm of MEK and 28.6 gm of a dispersion of Socal-31 (CaCO₃ powder, Solvay Chemicals) in MEK were thoroughly mixed and stirred at 55° C. for 12 minutes. The solution was then quenched by 1.5 gm of MEK-ST (silica dispersion from Nissan Chemicals). To this solution was added 44.6 gm of Ebcryl 1290 (aliphatic polyurethane acrylate, UCB Chemicals), 7.1 gm of a photoinitiator (PI) solution containing 24% of BMS, 12.7% of Irgacure 651, 2.4% of ITX, 6.34% of DBTDL and 1.58% of Irganox 1035 (thiodiethylene bis[3-(3,5-di-tert-butyl-4-hydroxyphenyl)propionate]) and 3.18% of Tinuvin 123 (decanedioic acid, bis(2,2,6,6-tetramethyl-1-(octyloxy)-4-piperidinyl)ester, reaction products with 1,1-dimethylethylhydroperoxide and octane from Ciba Specialty Chemicals) in MEK and 6.46 gm of a 25% poly-Q solution in MEK. The resultant durable layer composition was then coated onto the release film prepared from Preparation 1 with a #22 Meyer bar. The coated composite film was air dried and cured at 70° C. for 10 minutes. An adhesive consisting of 1 part of Sancure 2710 (aliphatic polyurethane from Noveon Inc., Cleveland, Ohio) and 3 parts of DI water was then overcoated onto the cured durable layer using a #11 Meyer bar with a target thickness of about 3 um. The resultant film was inserted into an injection mold. A polymer of PMMA (polymethylmethacrylate) was injected into the mold cavity at 490° F. with the adhesive layer facing the plastic mixture. The durable layer and the adhesive layer were completely transferred to the molded plastic article after the release film was peeled off. The molded article was then post cured by UV exposure (5.13 J/cm$^2$) using a Fusion conveyor curing system. The solvent resistance and abrasion resistance of the durable layer were evaluated and the results are summarized in the following table.

| Example | (i) | (ii) | (iii) | Curing Time | Solvent Resistance | Scratch Resistance | Surface Hardness | PMMA Injection Molding @ 490° F. |
|---|---|---|---|---|---|---|---|---|
| 13 | M-CAP | N3300A | Ebcryl 1290 | 70° C. for 10 minutes | Excellent | Excellent | >2H | Pass |

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A durable layer for in-mold decoration which is formed from a composition comprising:
   (i) a thermally crosslinkable and photochemically or radically graftable polymer, wherein said thermally crosslinkable and photochemically or radically graftable polymer is a polyvinyl alcohol derivative,
   (ii) a non-ethylenical thermal crosslinker, and
   (iii) a radiation curable multifunctional monomer or oligomer.

2. The durable layer of claim 1, wherein said polyvinyl alcohol derivative is polyvinyl acetal or polyvinyl butyral.

3. The durable layer of claim 1, wherein said thermally crosslinkable and photochemically and radically graftable polymer is present in the amount of about 10% to about 70% by weight of the total solid content of the composition.

4. The durable layer of claim 3, wherein said thermally crosslinkable and photochemically and radically graftable polymer is present in the amount of about 20% to about 50% by weight of the total solid content of the composition.

5. The durable layer of claim 1, wherein said non-ethylenical thermal crosslinker is a multifunctional isocyanate, multifunctional thioisocyanate, multifunctional epoxide, multifunctional aziridine, multifunctional carbodiimide, multifunctional ketenimide or a formaldehyde precondensate.

6. The durable layer of claim 1, wherein said non-ethylenical thermal crosslinker has more than two same functional groups.

7. The durable layer of claim 1, wherein said non-ethylenical thermal crosslinker is a multifunctional isocyanate or multifunctional epoxide.

8. The durable layer of claim 1, wherein said non-ethylenical thermal crosslinker is present in the amount of about 2% to about 60% by weight of the total solid content of the composition.

9. The durable layer of claim 8, wherein said non-ethylenical thermal crosslinker is present in the amount of about 3% to about 40% by weight of the total solid content of the composition.

10. The durable layer of claim 9, wherein said non-ethylenical thermal crosslinker is present in the amount of about 5% to about 25% by weight of the total solid content of the composition.

11. The durable layer of claim 1, wherein said radiation crosslinkable monomer or oligomer is a multifunctional acrylate, multifunctional methacrylate, multifunctional vinyl, multifunctional vinylether, multifunctional vinyl or allyl or multifunctional epoxide.

12. The durable layer of claim 11, wherein said radiation crosslinkable monomer or oligomer is a multifunctional acrylate.

13. The durable layer of claim 1, wherein said radiation crosslinkable monomers or oligomer is present in the amount of about 5% to about 80% by weight of the total solid content of the composition.

14. The durable layer of claim 13, wherein said radiation crosslinkable monomers or oligomer is present in the amount of about 20% to about 50% by weight of the total solid content of the composition.

15. The durable layer of claim 1, wherein the thermally crosslinkable and photochemically or radically graftable polymer, the non-ethylenical thermal crosslinker, and the radiation curable multifunctional monomer or oligomer are dispersed or dissolved in a solvent.

16. The durable layer of claim 15, wherein said solvent is methyl ethyl ketone, methyl propyl ketone, cyclohexanone, ethyl acetate, propyl acetate or butyl acetate.

17. The durable layer of claim 1, wherein the composition further comprises a retarder or quencher.

18. The durable layer of claim 17, wherein said retarder or quencher is silica, a fatty acid or acid anhydride.

19. The durable layer of claim 1, wherein the composition further comprises a catalyst or a second thermal crosslinker.

20. The durable layer of claim 19, wherein said catalyst or the second thermal crosslinker is an organotin, polyamine or polyol.

21. The durable layer according to claim 1, comprising:
   (a) a first network formed from the thermally crosslinkable and photochemically or radically graftable polymer (i) and the non-ethylenical thermal crosslinker (ii), and
   (b) a second network formed from the radiation curable multifunctional monomer or oligomer (iii) dissolved or dispersed inside the first network, wherein the first network and the second network form an interpenetration network.

22. A process for forming a durable layer for in-mold decoration according to claim 1, comprising the steps of:
   (a) thermally curing the thermally crosslinkable and photochemically or radically graftable polymer (i) and the non-ethylenical thermal crosslinker (ii) to form a first network with the radiation curable multifunctional monomer or oligomer (iii) dissolved or dispersed inside said first network; and
   (b) exposing the radiation curable multifunctional monomer or oligomer (iii) to radiation to form a second network, wherein the first network and the second network form an interpenetration network.

* * * * *